(No Model.) 6 Sheets—Sheet 1.

F. W. A. BOLDT.
MACHINE FOR BRANDING CORKS, &c.

No. 377,665. Patented Feb. 7, 1888.

Witnesses:
C. J. Beer
O. A. Clark

Inventor:
Friedrich Wilhelm Anton Boldt,
By Paine & Ladd,
Att'ys.

(No Model.)

F. W. A. BOLDT.

MACHINE FOR BRANDING CORKS, &c.

No. 377,665. Patented Feb. 7, 1888.

Witnesses:
C. T. Bell
O. A. Clark.

Inventor:
Friedrich Wilhelm Anton Boldt,
By Paine & Ladd,
Atty's.

(No Model.) 6 Sheets—Sheet 3.

F. W. A. BOLDT.
MACHINE FOR BRANDING CORKS, &c.

No. 377,665. Patented Feb. 7, 1888.

Witnesses:
C. T. Beck
O. A. Clark

Inventor,
Friedrich Wilhelm Anton Boldt,
By Paine & Last,
Atty's.

(No Model.) 6 Sheets—Sheet 4.
F. W. A. BOLDT.
MACHINE FOR BRANDING CORKS, &c.
No. 377,665. Patented Feb. 7, 1888.

Witnesses:
C. S. Bell
O. A. Clark

Inventor,
Friedrich Wilhelm Anton Boldt,
By Paine & Ladd,
Atty's.

(No Model.) 6 Sheets—Sheet 5.
F. W. A. BOLDT.
MACHINE FOR BRANDING CORKS, &c.

No. 377,665. Patented Feb. 7, 1888.

Witnesses:
C. J. Beer
O. A. Clark

Inventor:
Friedrich Wilhelm Anton Boldt.
By Paine & Ladd,
Atty's.

(No Model.)  6 Sheets—Sheet 6.

F. W. A. BOLDT.

MACHINE FOR BRANDING CORKS, &c.

No. 377,665.  Patented Feb. 7, 1888.

Witnesses:
C. T. Rees
O. A. Clark

Inventor:
Friedrich Wilhelm Anton Boldt
By Paine & Ladd,
Atty's.

UNITED STATES PATENT OFFICE.

FRIEDRICH WILHELM ANTON BOLDT, OF HAMBURG, GERMANY, ASSIGNOR TO BOLDT & VOGEL, OF SAME PLACE.

MACHINE FOR BRANDING CORKS, &c.

SPECIFICATION forming part of Letters Patent No. 377,665, dated February 7, 1888.

Application filed December 8, 1885. Serial No. 185,070. (No model.) Patented in Germany April 23, 1885, No. 33,682.

*To all whom it may concern:*

Be it known that I, FRIEDRICH WILHELM ANTON BOLDT, a subject of the German Emperor, and a resident of Hamburg, in the German Empire, have invented certain new and useful Improvements in Machines for Branding Corks and Bungs, (for which a patent has been obtained in Germany, dated April 23, 1885, No. 33,682,) of which the following is a specification.

My invention relates to improvements in machines for branding corks and bungs; and the objects of my improvements are, first, to transport the corks or bungs through the machine in such a manner as to brand them on all sides; second, to provide suitable means for heating the branding-stamps; third, to regulate the supply of the corks or bungs in the feeding channel, and, fourth, to adjust the feeding-channel for different sizes of corks or bungs. I attain these objects by the mechanism illustrated in the accompanying drawings, in which—

Figure 1:
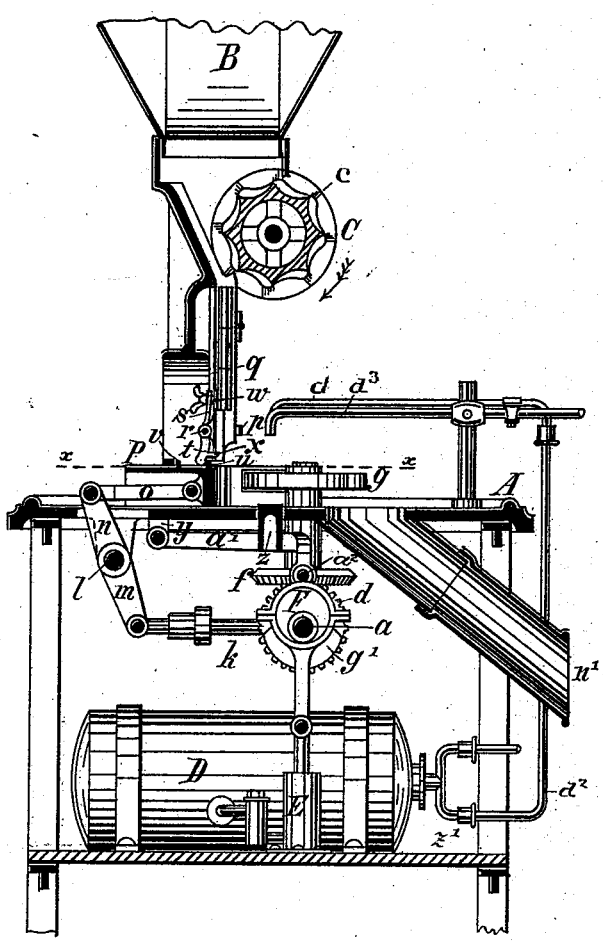
Figure 2:
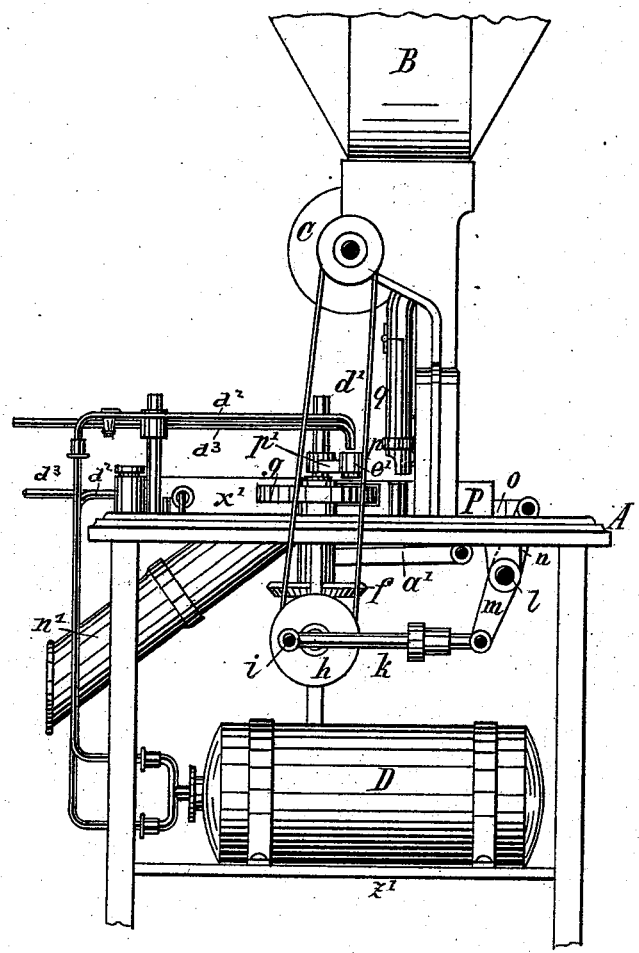
Figure 3:
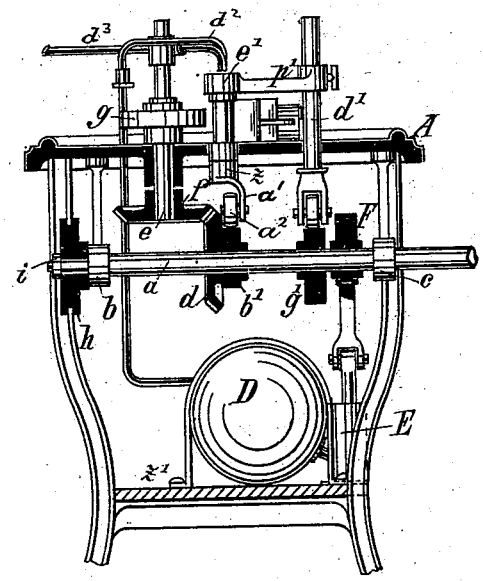
Figure 4:
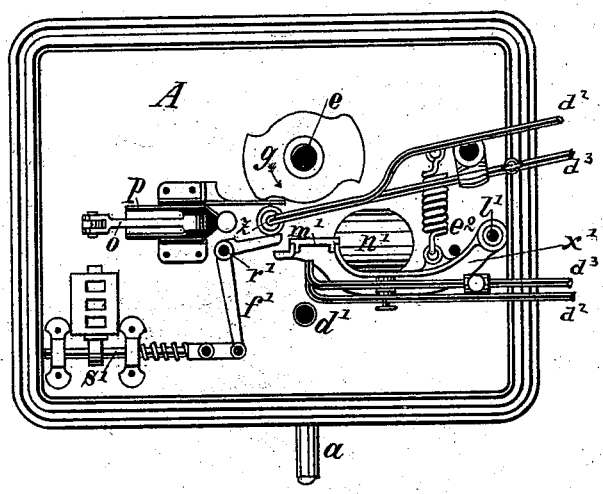
Figure 5:
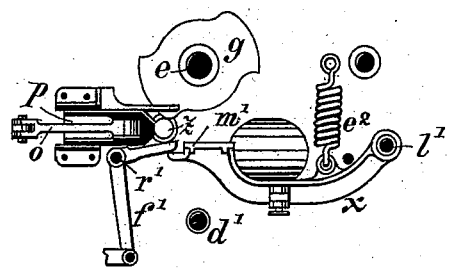
Figure 6:
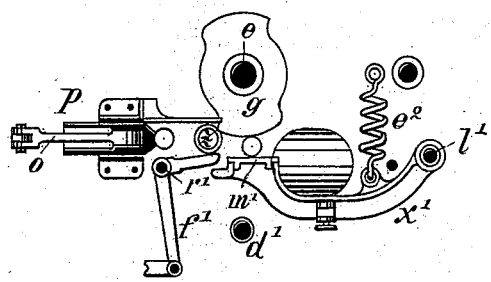
Figure 7:
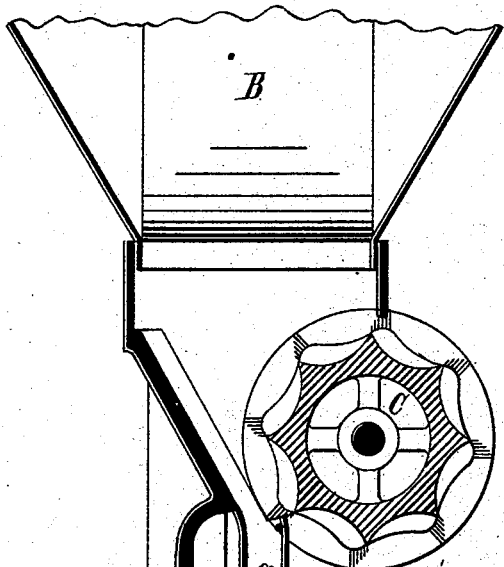
Figure 8:
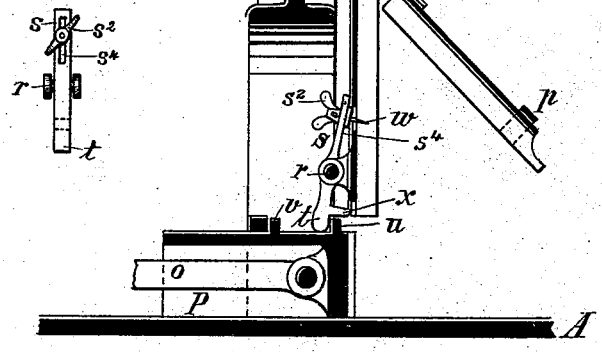

Figure 1 is a vertical section of a machine provided with my improvements. Fig. 2 is a back elevation of the same. Fig. 3 is a side elevation. Fig. 4 is a sectional plan view from above, taken on the line $x\ x$ in Fig. 1. Figs. 5 and 6 are also sectional plan views from above, taken on the line $x\ x$, showing the branding mechanism in different positions. Fig. 7 is an enlarged vertical section of the upper part of the machine, and Fig. 8 shows the slot in the arm $s$. All figures are partly in section.

Similar letters refer to similar parts throughout the several views.

Beneath the table A runs in bearings $b$ and $c$ the main shaft $a$, provided with a bevel-wheel, $d$, which engages into another bevel-wheel, $f$, fixed to the vertical shaft $e$. To the top of the shaft $e$ is attached a cam, $g$. A groove-wheel, $h$, keyed to the one extremity of the main shaft $a$, is provided with a crank-pin, $i$, which imparts an oscillating motion, by means of the pitman $k$, to the levers $m$ and $n$ of the shaft $l$. The lever $n$ is connected by the rod $o$ to the slide P, which thus will be reciprocated when the shaft $a$ rotates.

The corks or bungs to be branded are placed in the funnel B, where they are stirred up by the prism C, which rotates in consequence of its connection with the groove-wheel $h$. The prismatic drum C has the several series of wire teeth, $c$, which teeth are long enough at the ends of the drum to prevent the corks or bungs from passing down into the tube $q$; but at the center of the drum they are short enough to permit a cork or bung, if presented endwise, to pass and fall into the tube. The revolution of the prismatic toothed drum in the direction indicated by the arrow lifts the corks which are not in proper position for falling into the lower tube and turns them over until they fall into line. The corks thereby drop, when coming into the right position, into the channel $q$, wherefrom they fall one by one before the slide P. To effect this, a lever, $s\ t$, pivoted at $r$, is oscillated by means of the brackets $u$ and $v$ of the slide P. A pin, $w$, fixed to the arms $s$, arrests the lowest but one cork or bung until the lowest one is removed by the slide P from beneath the pipe $q$. A nose, $x$, of the other arm, $t$, of the lever $s\ t$ holds the lowest cork or bung until the pin $w$ pierces the next upper one. In order to adjust the pin $w$ for long and short corks or bungs, it is fixed into a slot, $s^4$, of the arm $s$ by means of a thumb-screw, $s^2$, as shown in Figs. 7 and 8.

The channel $q$ is made at its lower end of two halves hinged together, which can be drawn more or less near to each other by means of a ring-clamp, $p$, in order to adjust the lower end of the channel for corks or bungs of different diameter.

To the bracket $y$ at the lower side of the table A is pivoted the lever $a'$, the free end of which is bent at right angles and provided with the roller $a^2$, as shown in Figs. 1 and 3, which is raised and lowered by means of a cam, $b'$, attached to the bevel-wheel $d$, and whereon a branding-die, $z$, is fastened. A second branding-die, $e'$, is attached to the arm $p'$, adjustably connected with the rod $d'$, which is raised and lowered by the cam $g'$ of the shaft $a$. Both dies $z$ and $e'$ are in the same vertical line and move against and from each other, according to the position of the cams $b'$ and $g'$. A third branding-die, $m'$, swings with its arm $x'$ around the pivot $e'$, and is pressed by the spring $e^2$ toward the cam $g$.

The bell-crank $f''$, pivoted at $r'$, is connected by the rod $s'$ to a suitable counting device. The air-pump E, worked by the eccentric F of the shaft $a$, forces air into the air-chamber D, supported by the plate $z'$. From the chamber the air is supplied to the pipes $d^2$, conducting to the branding-dies, in order to heat them by blow-pipe flames, the gas being supplied by the pipes $d^3$. The embodiment of the air-compressing mechanism with the other mechanisms in one machine makes it complete in itself, requiring only the attachment of its gas-pipe to the ordinary gas-supply pipes of a factory to make it ready for use.

I am aware that blow-pipe flames are often used in the arts, and I do not claim the same, broadly, in connection with branding-machines; but I consider my invention as including the combination, with a branding-machine, of air-compressing devices forming a component part of the machine, whereby the machine is capable of doing its work better and more expeditiously than like machines heretofore used.

The machine works as follows: After the corks or bungs are dropped from the funnel B into the channel $q$ the lowest cork or bung is advanced by the slide P, thus causing the bell-crank $f'$ to oscillate for actuating the counter. In the advanced position the cork or bung is branded at the top and the bottom by the dies $z$ and $e'$. As soon as the latter are raised or lowered respectively by the cams $b'$ and $g'$, the cam $g$ catches the cork or bung and rolls it along the die $m'$, thus branding the circumference of the cork or bung, which then drops out of the machine through a suitable opening or channel, $n'$, into a basket or box placed thereunder.

Having thus fully described my invention, what I desire to claim, and secure by Letters Patent, is—

1. In machines for branding corks or bungs, the combination of the slide P, provided with the brackets $u$ and $v$, with the lever $s\ t$, provided with the pin $w$ and nose $x$, substantially as and for the purpose specified.

2. In machines for branding corks or bungs, the combination of a funnel for holding the corks, the channel $q$, the lower part of which is made of two portions hinged together and adapted to receive the corks from the funnel, and a ring-clamp secured to the lower part of the said channel for keeping the hinged portions of it together, substantially as and for the purpose specified.

3. In machines for branding corks or bungs, the combination of the cams $b'$ and $g'$, secured upon a revolving shaft, the lever $a'$, pivoted at one end and provided with the branding-die $z$, actuated from the cam $b'$, the rod $d'$, provided with the adjustable arm $p'$, and branding-die $e'$, actuated from the cam $g'$, the said cams and levers being arranged to brand the opposite ends of the corks simultaneously, substantially as specified.

In testimony that I claim the foregoing as my invention I have signed my name, in presence of two witnesses, this 18th day of November, 1885.

FRIEDRICH WILHELM ANTON BOLDT.

Witnesses:
ALEXANDER SPECHT,
EMIL HAASE.